(12) United States Patent
Yamagata

(10) Patent No.: US 6,609,072 B1
(45) Date of Patent: Aug. 19, 2003

(54) INFORMATION TERMINAL DEVICE, INPUT/OUTPUT CONTROL METHOD AND STORING MEDIUM

(75) Inventor: Hideto Yamagata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/204,381

(22) Filed: Dec. 2, 1998

(30) Foreign Application Priority Data

Feb. 12, 1997 (JP) .............................................. 9-331730

(51) Int. Cl.⁷ .............................................. G01R 19/00
(52) U.S. Cl. ......................... 702/64; 713/300; 713/340
(58) Field of Search ................................ 324/427, 428; 702/57, 58, 59, 60, 61, 62, 63; 320/136; 713/300, 340, 324

(56) References Cited

U.S. PATENT DOCUMENTS

| | | | | |
|---|---|---|---|---|
| 5,345,392 A | * | 9/1994 | Mito et al. ................... | 364/483 |
| 5,394,089 A | * | 2/1995 | Clegg ......................... | 324/427 |
| 5,459,671 A | * | 10/1995 | Duley ......................... | 364/483 |
| 5,511,205 A | | 4/1996 | Kannan et al. | |
| 5,532,935 A | | 7/1996 | Ninomiya et al. | |
| 5,560,022 A | * | 9/1996 | Dunstan et al. ............. | 713/300 |
| 5,652,502 A | * | 7/1997 | Van Phuoc et al. ........... | 320/30 |
| 5,845,142 A | * | 12/1998 | Hayasaka .................... | 713/340 |

FOREIGN PATENT DOCUMENTS

| | | |
|---|---|---|
| JP | 2-278319 | 11/1990 |
| JP | 4-283675 | 10/1992 |
| JP | 5-307431 | 11/1993 |
| JP | 6-67766 | 3/1994 |

OTHER PUBLICATIONS

Copy of European Search Report dated Feb. 26, 2003.

* cited by examiner

*Primary Examiner*—Marc S. Hoff
*Assistant Examiner*—Mohamed Charioui
(74) *Attorney, Agent, or Firm*—Dickstein, Shapiro, Morin & Oshinsky, LLP.

(57) ABSTRACT

A driver stores an electricity consumption value of corresponding input/output hardware. The stored electricity consumption value is registered in an electricity consumption value table in accordance with a setting of the driver when an operating system carries out input/output function. When an application program requires to use the input/output function, the operating system judges whether or not the required input/output of data can be stably carried out with the remaining quantity of the battery measured by a battery remaining quantity measuring instrument, and it is judged that the input/output can be carried out stable, the operating system allows a corresponding driver to drive the input/output hardware. With this feature, the operation of an input/output device is prevented from being unstabilized due to shortage of battery volume without changing an operating system even when electricity consumption of the input/output device is varied due to a setting or the input/output device is exchanged or newly added.

23 Claims, 9 Drawing Sheets

INFORMATION TERMINAL DEVICE, INPUT/OUTPUT CONTROL METHOD AND STORING MEDIUM

BACKGROUND OF THE INVENTION

1. Field of the Invention

The present invention relates to an information terminal device, an input/output control method and a storing medium, and more particularly, to a control of input/output when a remaining quantity of a battery of an information terminal device driven by the battery becomes equal to or less than a predetermined value.

2. Description of the Related Art

In general, a portable terminal device is driven by a battery. If a remaining quantity of the battery is reduced, input/output operation such as communication is not carried out stably, and there is an unfavorable possibility that an error may be generated in data which is input or output. For such a case, technique for stopping the communication function of the portable terminal device when the remaining quantity of the battery is small for avoiding a failure due to shortage of the battery remaining quantity is disclosed in Japanese Patent Application Laid-open No.6-67766.

FIG. 1 is a functional block diagram showing a functional structure of the above mentioned conventional portable terminal device.

In this portable terminal device, a judging means 65 compares a remaining quantity of a battery 61 detected by a battery remaining quantity detecting means 63 and a battery volume necessary for communication for a communicating means 62 estimated by an estimating means 64, thereby judging whether there is enough battery remaining quantity necessary for communication. As a result, if there is enough battery remaining quantity necessary for communication, the judging means 65 permits the to communicate means 62 communicating, and if there is not enough battery remaining quantity/power necessary for communication, the judging means 65 prohibits the communicating means 62 from communicating. If the communication is inhibited, the judging means 65 suppresses other function by function suppressing means 67, and newly judges a battery remaining quantity necessary for communication from electricity consumption of suppressed function, thereby avoiding a failure of communication due to shortage of electricity.

The conventional device described above has several disadvantages. For example, some communicating means such as modems can change communication speed, and electricity consumption may be varied depending upon change in the communication speed. However, in the above mentioned conventional example, a variation in electricity consumption is not taken into account. Therefore, when the communication speed is changed in the above mentioned conventional example, a program of the estimating means 64, i.e., an operating system of the portable terminal device must be changed.

Further, among portable terminal devices, some communicating means are exchangeable such as PCMCIA modems each having different electricity consumption. However, a case in which the modem is exchanged is not taken into account in the above mentioned conventional example. Therefore, in the conventional example, a program of the estimating means 64, i.e., an operating system of the portable terminal device must be changed if the communicating means is exchanged.

Furthermore, in the above mentioned portable terminal device, only a case in which operation of a single communicating means is controlled is taken into account. However, there is a case in which one portable terminal device includes a plurality of communicating means such as a LAN card and an infrared modem in addition to a modem. Such a case in which other communicating means are added is not taken into account in the above mentioned conventional example. It is possible, whenever a communicating means is newly added, to add another estimating means 64 which corresponds to the added communicating means, but in such a case also, the operating system must be changed.

Also, when the operation becomes unstable due to decrease in electricity, and there is a problem in quality of data, such a problem arises also in other input/output means in addition to the communicating means. However, an input/output means other than the communicating means is not taken into account in the conventional example.

SUMMARY OF THE INVENTION

It is an object of the present invention to provide an information terminal device capable of preventing the operation of an input/output device from being unstabilized due to shortage of battery volume without changing an operating system even when electricity consumption of the input/output device is varied due to a setting or the input/output device is exchanged or newly added.

Another object of the invention is to provide an input/output control method capable of preventing the operation of an input/output device from becoming unstabilized due to shortage of battery volume without changing an operating system even when electricity consumption of the input/output device is varied due to a setting or the input/output device is exchanged or newly added.

Further, another object of the invention is to provide a computer-readable storing medium in which a program for realizing the above mentioned input/output control method is stored.

An information terminal device driven by a battery according to a first aspect of the present invention comprises: an input/output device; a battery remaining quantity/capacity measuring means for measuring a remaining quantity/capacity of the battery; a driving means for operating the input/output device and storing electricity consumption of the input/output device when the input/output device is operated; and electricity consumption registering means for registering the electricity consumption stored in the driving means; a judging means for judging, when an input or output of data to or from the input/output device is required, whether or not the battery remaining quantity/capacity measured by the battery remaining quantity measuring means is enough for carrying out such a required input or output of data with the electricity consumption registered in the electricity consumption registering means; and an input/output permitting means for permitting the input/output device to carry out the input or output of data when the judging means judges that the battery remaining power/quantity is enough.

In the above information terminal device, when the judging means judges that there is enough battery remaining quantity, input or output of data by the input/output device is permitted by the permitting means. Therefore, when the battery remaining quantity is not enough, data is not input or output in an unstable operational state. Further, in the information terminal device, the electricity consumption of the input/output device stored in the driving means is registered in the electricity consumption registering means. Then, the judging means judges in accordance with the registered electricity consumption. Therefore, even when the input/output device is exchanged or newly added, it is unnecessary to make change in any other portion than only if there is a driving means corresponding to such exchanged or newly added input/output device.

In the above information terminal device, electricity consumption of the input/output device may be varied depending upon a setting of the driving means. In such a case, the driving means stores electricity consumption of the input/output device for every setting; the information terminal device further comprises; a setting changing means for changing the setting of the driving means when the judging means judges that the battery remaining quantity is not enough; and a re-registering means for registering, in the electricity consumption registering means, the electricity consumption stored in the driving means corresponding to a setting which is changed by the setting changing means.

In this case, electricity consumption corresponding to the changed setting is re-registered in the re-registering means by changing the setting of the driving means by the setting changing means, and the input/output device can be operated in accordance with the re-registered electricity consumption. Therefore, it is possible to allow the input/output device to operate needed operation as much as possible. In this case also, it is unnecessary to make change in other portions.

An information terminal device driven by a battery according to a second aspect of the invention comprises: an input/output device; a battery remaining quantity measuring means for measuring a remaining quantity of the battery; a driving means for operating the input/output device; an electricity consumption measuring means for measuring electricity consumption when the driving means operates the input/output device; an electricity consumption registering means for registering the electricity consumption measured by the electricity consumption measuring means; a judging means for judging, when input or output of data to or from the input/output device is required, whether or not the battery remaining quantity measured by the battery remaining quantity measuring means is enough for carrying out such a required input or output of data with the electricity consumption registered in the electricity consumption registering means; and an input/output permitting means for permitting the input/output device to carry out the input or output of data when the judging means judges that the battery remaining quantity is enough.

In the above information terminal device, when the judging means judges that there is enough battery remaining quantity, input or output of data by the input/output device is permitted by the permitting means. Therefore, when the battery remaining quantity is not enough, data is not input or output in an unstable operational state. Further, in the information terminal device, the electricity consumption of the input/output device measured by the electricity consumption measuring means is registered in the electricity consumption registering means. Therefore, when the input/output device is used second time or subsequent time, the judging means judges in accordance with this registered electricity consumption. For this reason, even if the electricity consumption of the input/output device corresponding to the driving means is not stored, the same effect as the information terminal device of the first aspect can be obtained. Further, even if the input/output device is changed or newly added, it is unnecessary to make change in other portions other than the driving means corresponding to the changed or newly added input/output device.

In the information terminal of the first or second aspect, the judging means may comprise: a completion time calculating means for calculating time required for completing the required input or output of data to or from the input/output device; an operational time calculating means for calculating a continuously operational time of the input/output device with electricity consumption registered in the electricity consumption registering means within the battery remaining quantity measured by the battery remaining quantity measuring means; and a comparing means for comparing the time calculated by the completion time calculating means with the time calculated by the operational time calculating means.

In the information terminal of the first or second aspect, the input/output device may be provided plurally. In that case, the driving means is provided for each of the input/output devices correspondingly; the electricity consumption registering means stores electricity consumption stored in each of the driving means associated with the input/output devices or the driving means; and the judging means judges whether electricity consumption associated with the input/output device or the driving means for carrying out the required input or output of data is enough or carrying out the required input or output of data.

An input/output control method according to a third aspect of the present invention is an input/output control method for controlling an input/output device driven by a battery and controlled by a driver in which electricity consumption of a corresponding input/output device is stored.

This input/output control method comprises: an electricity consumption registering step for registering the electricity consumption of the input/output device stored in the driver; a battery remaining quantity measuring step for measuring the battery remaining quantity when input or output of data to or from the input/output device is required; a judging step for judging whether or not the battery remaining quantity measured by the battery remaining quantity measuring step is enough for carrying out such a required input or output of data with the electricity consumption registered in the electricity consumption registering step; and a permitting step for driving the driver for allowing the input/output device to carry out the input or output of data when the judging step judges that the battery remaining quantity is enough.

In this input/output control method, electricity consumption of the input/output device is varied depending upon a setting of the driver; the driver stores electricity consumption of the input/output device for every setting; the input/output control method further comprises; a setting changing step for changing the setting of the driver when the judging step judges that the battery remaining quantity is not enough; and an electricity consumption re-registering step for substituting and re-registering electricity consumption store in the driver corresponding to a setting which is changed by the setting changing step for electricity consumption registered in the registering step.

An input/output control method according to a fourth aspect of the invention is an input/output control method for controlling an input/output device driven by a battery and controlled by a driver.

This input/output control method comprises: an electricity consumption measuring step for measuring electricity consumption when the driver operates the input/output device; an electricity consumption registering step for registering the electricity consumption measured by the electricity consumption measuring step; a battery remaining quantity measuring step for measuring a remaining quantity of the battery when input or output of data to or from the input/output device is required; a judging step for judging whether or not the battery remaining quantity measured by the battery remaining quantity measuring step is enough for carrying out such a required input or output of data with the electricity consumption registered in the electricity consumption registering step; and a permitting step for driving the driver for allowing the input/output device to carry out the input or output of data when the judging step judges that the battery remaining quantity is enough.

A storing medium according to a fifth aspect of the invention is a storing medium for storing a program for realizing an input/output control method for controlling an input/output device driven by a battery and controlled by a driver in which electricity consumption of a corresponding input/output device is stored.

This storing medium is for storing a program for realizing following steps: an electricity consumption registering step for registering the electricity consumption of the input/output device stored in the driver; a battery remaining quantity measuring step for measuring the battery remaining quantity when input or output of data to or from the input/output device is required; a judging step for judging whether or not the battery remaining quantity measured by the battery remaining quantity measuring step is enough for carrying out such a required input or output of data with the electricity consumption registered in the electricity consumption registering step; and a permitting step for driving the driver for allowing the input/output device to carry out the input or output of data when the judging step judges that the battery remaining quantity is enough.

According to a further aspect of this invention, a storing medium is provided for storing a program for realizing following steps: an electricity consumption of the input/output device is varied depending upon a setting of the driver; the driver stores electricity consumption of the input/output device for every setting; the input/output control method further comprises; a setting changing step for changing the setting of the driver when the judging step judges that the battery remaining quantity is not enough; and an electricity consumption re-registering step for substituting and re-registering electricity consumption store in the driver corresponding to a setting which is changed by the setting changing step for electricity consumption registered in the registering step.

A storing medium according to a sixth aspect of the invention is a storing medium for storing a program for realizing an input/output control method for controlling an input/output device driven controlled by a battery and by a driver.

The storing medium is for storing a program for realizing the following steps: an electricity consumption measuring step for measuring electricity consumption when the driver operates the input/output device; an electricity consumption registering step for registering the electricity consumption measured by the electricity consumption measuring step; a battery remaining quantity measuring step for measuring a remaining quantity of the battery when input or output of data to or from the input/output device is required; a judging step for judging whether or not the battery remaining quantity measured by the battery remaining quantity measuring step is enough for carrying out such a required input or output of data with the electricity consumption registered in the electricity consumption registering step; and a permitting step for driving the driver for allowing the input/output device to carry out the input or output of data when the judging step judges that the battery remaining quantity is enough.

According to the present invention, when the battery remaining quantity is not enough, data is not input or output in unstable operational state. Further, when an input/output device is changed or newly added, it is unnecessary to make a change in any portion other than the driving means (driver) corresponding to such a changed or newly added electricity consumption device.

Further, when electricity consumption of the input/output device is varied by the setting of the driving means (driver), it is possible to allow the input/output to operate as much as possible by changing the setting of the driving means (driver) to a lower electricity consumption side.

BRIEF DESCRIPTION OF THE DRAWINGS

FIGS. 4A and 4B are views for showing an address structure of a driver shown in FIG. 2, wherein FIG. 4A shows a case in which a corresponding hardware has a single electricity consumption value, and FIG. 4B shows a case in which the electricity consumption value of the corresponding input/output hardware can be changed by setting;

DESCRIPTION OF THE PREFERRED EMBODIMENT

A preferred embodiment of the present invention will be explained with reference to the accompanying drawings below.

Figure 1:
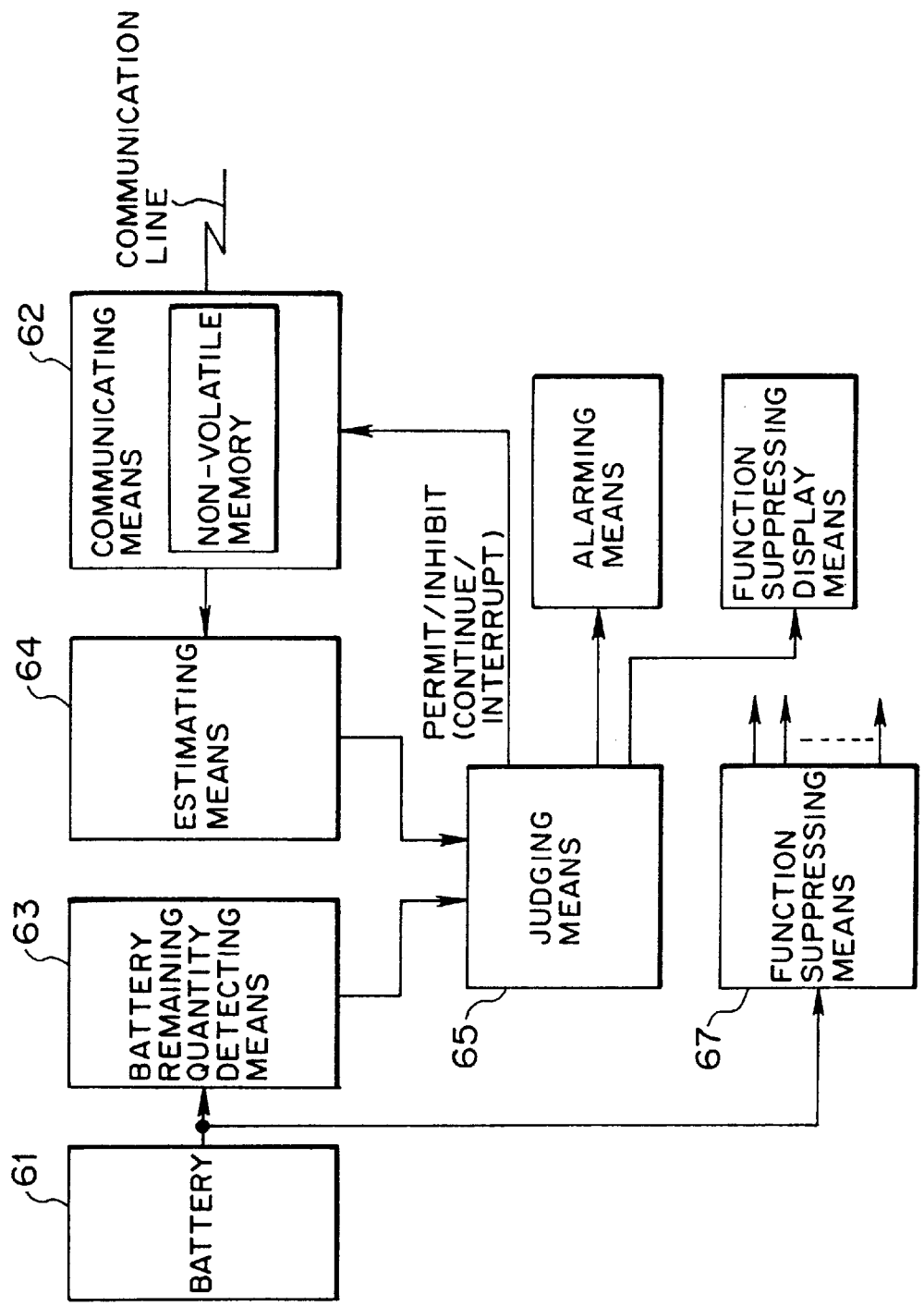
FIG. 1 is a functional block diagram showing a functional structure of a conventional portable information terminal device.
Figure 2:
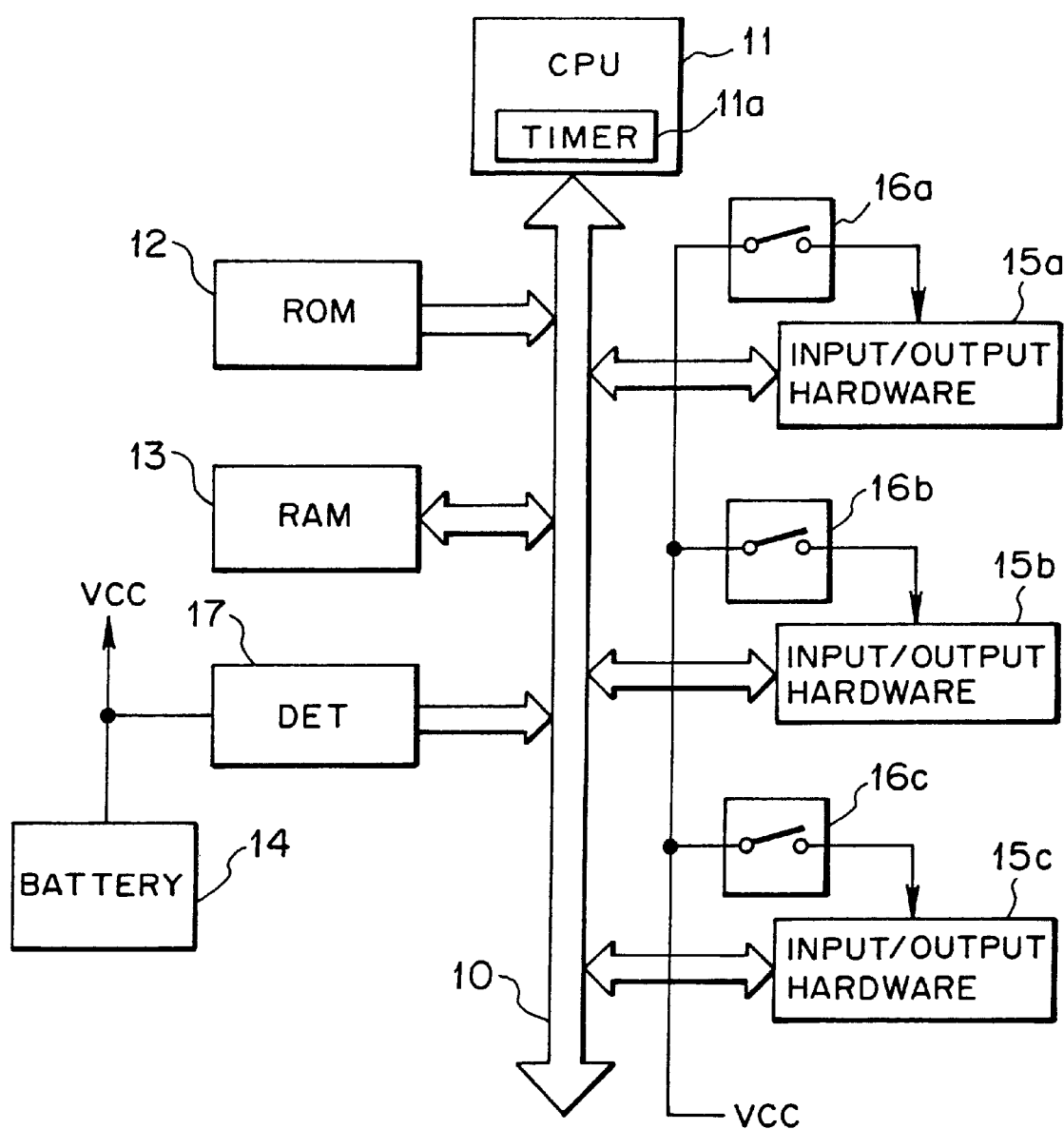
FIG. 2 is a block diagram showing a circuit structure of a portable information terminal device according to an embodiment of the present invention.

FIG. 2 is a block diagram showing a circuit structure of a portable information terminal device according to the embodiment of the present invention.

As shown in FIG. 2, the portable terminal device comprises a CPU 11, a ROM 12, a RAM 13, a battery 14, input/output hardware 15a to 15c, switches 16a to 16c and a battery remaining quantity measuring instrument (DET) 17. The CPU 11, the ROM 12, the RAM 13, the input/output hardware 15a to 15c, the switches 16a to 16c and the battery remaining quantity measuring instrument (DET) 17 are connected together through a bus 10.

The CPU 11 executes process programs which are stored in the ROM 12 and shown in the flow chart as will be described in later. When the CPU 11 executes these programs, functions which will be described later are realized in the portable terminal device. The CPU 11 is provided therein with a timer 11a, and battery remaining quantity checking process which will be described later is carried out in accordance with interrupt requested at predetermined time intervals from the timer 11a.

The ROM 12 stores data used by or in the process program of the CPU 11. The ROM 12 stores programs of an operating system which will be described later (here, this means an operating system in a wide sense, and this includes drivers) or application programs. The ROM 12 is a non-volatile memory and thus, data is held even if the portable terminal device is turned OFF.

The RAM 13 is a volatile memory constituted by a semiconductor memory, and is used as a working area of the CPU 11.

In this portable terminal device, different addresses are allocated to the ROM 12 and RAM 13. The CPU 11 may directly read the process program from the ROM 12 and execute, or may transfer the process program store in the ROM 12 to the RAM 13, and read the process program from the RAM 13 and execute. A program in which a setting of a driver is changed as will be described later is always transferred from the ROM 12 to RAM 13 and executed.

The battery 14 supplies electricity to various portions of the portable terminal such as input/output hardware 15a to 15c. The battery 14 may be a flashlight battery, battery pack type battery, or a storage battery. The battery 14 may be one which is an external battery to be mounted to the outside the portable terminal device.

Although only three input/output hardware 15a to 15c are shown in FIG. 2, the number of input/output hardware is not limited. Examples of the input/output hardware 15a to 15c are keyboard for inputting characters or numbers, a liquid crystal display apparatus, a touch panel provided in front of the liquid crystal display apparatus, a disk device for reading and writing data on a floppy disk, a LAN card for sending and receiving, through LAN, data to or from another computer connected to the LAN, and a modem for sending and receiving data to or from another computer through telephone line. As will be described later, electricity consumption of some of the input/output hardware 15a to 15c may be varied by the setting.

The switches 16a to 16c are provided such as to correspond to the input/output hardware 15a to 15c, supplies or cuts the supply of electricity from the battery 14. The switches 16a to 16c may be hardware switches such as FET, or may be software switches for stopping driving function which will be described later for driving the corresponding input/output hardware 15a to 15c.

The battery remaining quantity measuring instrument 17 measures a remaining quantity of the battery 14.

Figure 3:
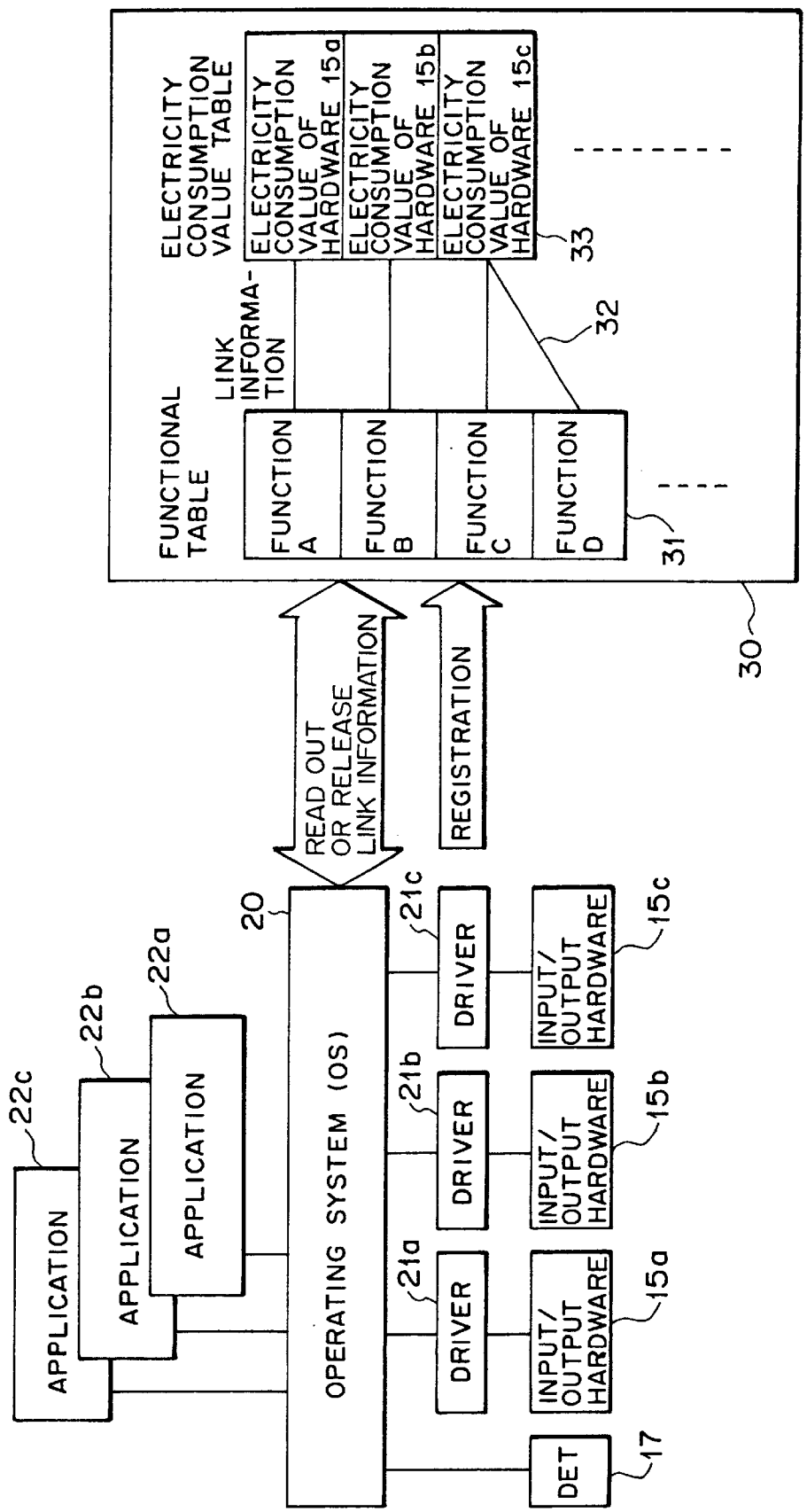
FIG. 3 is a functional block diagram showing a functional structure of the portable information terminal device according to the embodiment of the present invention.

FIG. 3 is a functional block diagram showing the function of this portable terminal device which is realized if the CPU 11 executes the process program stored in the ROM 12.

As shown in FIG. 3, the function of this portable terminal device comprises an operating system 20, drivers 21a to 21c, application programs 22a to 22c, input/output hardware 15a to 15c, the battery remaining quantity measuring instrument 17, a function table 31 including link information 32, and a working area 30 in RAM 13 in which a electricity consumption value table 33 is written for process execution.

The operating system 20 executes input/output functions which will be described later based on request from application programs 22a to 22c, and executes a process of battery remaining quantity checking which will be described later based on interruption from the timer 11a provided in the CPU 11. When the process is executed, the operating system 20 accesses and writes the link information 32 and the electricity consumption value table 33 from ROM 12 to working area 30. The operating system 20 writes the electricity consumption value on the electricity consumption value table 33 by a setting value indicated by the application programs 22a to 22c or a default value held by the operating system 20 when the input/output function is executed.

The drivers (device drivers) 21a to 21c respectively control the input/output hardware 15a to 15c to input or output. The address structure of the drivers 21a to 21c differs depending upon whether or not the electricity consumption of the corresponding input/output hardware 15a to 15c is varied by a setting value indicated by the operating system 20.

Figure 4A:
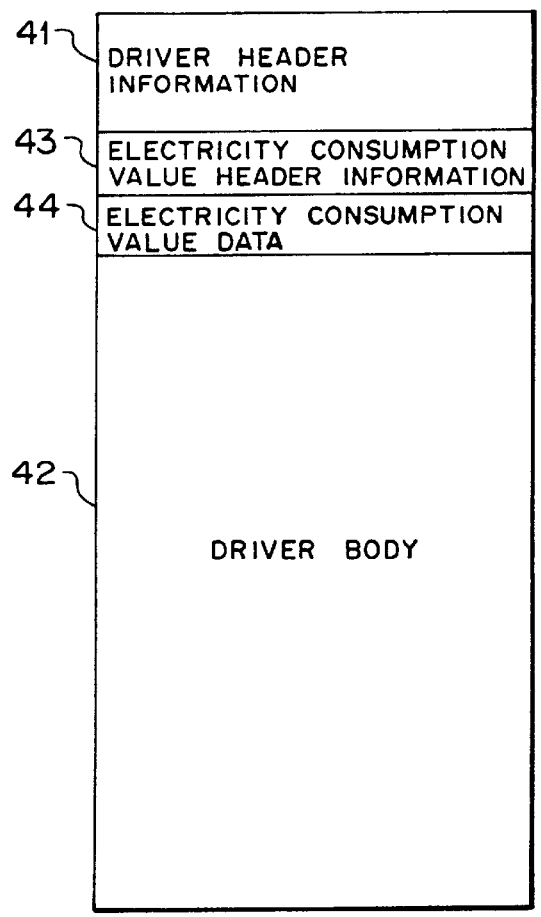

When the electricity consumption of the corresponding input/output hardware 15a to 15c is not varied by the setting value, each of the drivers 21a to 21c comprises driver header information 41, a driver body 42, input/output value header information 43 and electricity consumption value data 44 as shown in FIG. 4A.

Figure 4B:
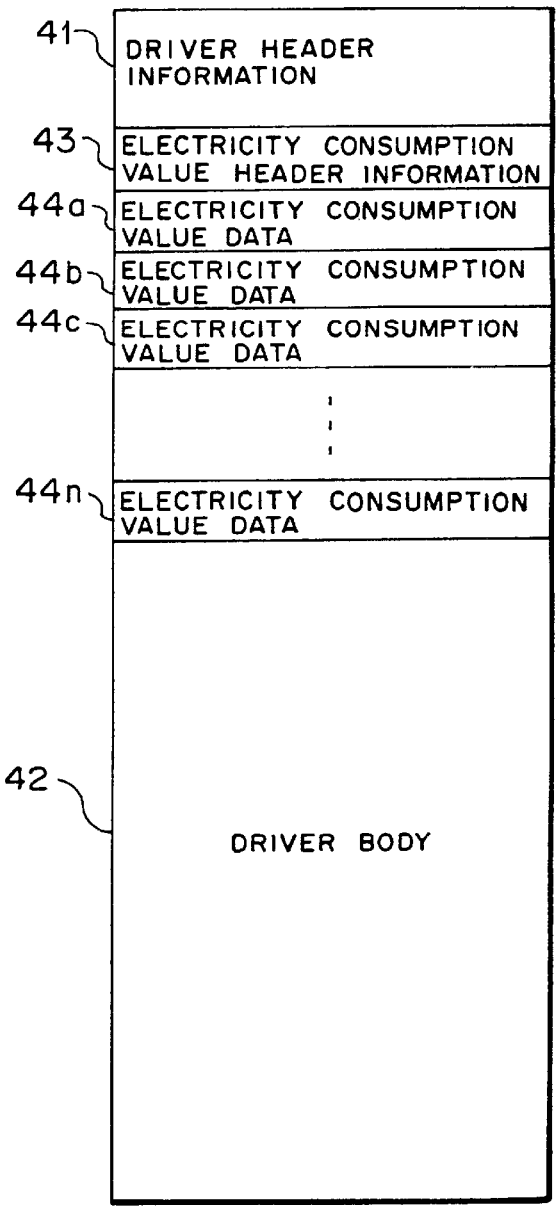

When the electricity consumption of the corresponding input/output hardware 15a to 15c is varied by the setting value, each of the drivers 21a to 21c comprises driver header information 41, a driver body 42, input/output value header information 43 and a plurality of electricity consumption value data 44a to 44n as shown in FIG. 4B.

The driver header information 41 includes information concerning a starting address of the driver body 42 and attribute of the driver. The driver body 42 is a program for controlling the corresponding input/output hardware 15a to 15c. The electricity consumption value header information 43 includes information concerning whether the number of the electricity consumption value of the corresponding input/output hardware 15a to 15c is one or more, and if the number of the electricity consumption value is more than one, the electricity consumption value header information 43 further includes information concerning associative relation between the setting value and the electricity consumption value data. The electricity consumption data 44, 44a to 44n are information concerning the electricity consumption of the corresponding input/output hardware, and the electricity consumption data 44a to 44n in FIG. 4B are information corresponding to the respective setting values.

Referring back to the functional block diagram in FIG. 3, the application programs 22a to 22c are programs for realizing functions such as word processor, spreadsheet program, database, schedule management or communication, and are executed under control of the operating system 20.

As described, the working area 30 is provided in the RAM 13.

In the functional table 31 which is written in the work area 30, input/output functions of the operating system 20 are listed and stored.

Electricity consumption values respectively corresponding to the input/output hardware 15a to 15c are written in the electricity consumption value table 33. When the electricity consumption of the input/output hardware 15a to 15c are not varied, the electricity consumption value data 44 of the corresponding drivers 21a to 21c are written in the electricity consumption value table 33. When the electricity consumption of the input/output hardware 15a to 15c are varied by the setting value, among the electricity consumption value data of the corresponding drivers 21a to 21c, only electricity consumption value data corresponding to the setting value is written.

The link information 32 indicates which of the input/output hardware 15a to 15c should be used to realize the input/output function of the operating system 20 written in the functional table 31. The order of priority is set in the link information 32 such that the link information 32 is released as will be described later, in increasing order of priority.

The operation of the portable information terminal device will be explained below.

First, when this portable information terminal device is turned on, a boot program is operated and the operating system 20 is started. The operating system 20 uses working area 30 to register input/output functions realized by the operating system 20 in the functional table 31, and after reading the electricity consumption value data 44, 44a to 44n based on default setting values, to register the same in the electricity consumption value table 33. Then, the link information 32 is set with respect to the various functions registered in the functional table 31 and electricity consumption values of the hardware 15a to 15c registered in the electricity consumption value table 33.

Then, any of the application programs 22a to 22c are executed by a user's request from the portable terminal device.

Next, it is supposed that input/output is requested by application program 22a to 22c executed by the user's request. At that time, the application program transfers respective setting values of the drivers 21a to 21c executed by function of the operating system 20 that corresponds to a request stored in the functional table 31, and data to be input or output, to the operating system 20 as parameters. Then, based on the transferred parameters, the processing "execution of input/output control" which is a function of the operating system 20 and is shown in the flow chart in FIG. 5 is carried out.

Figure 5:
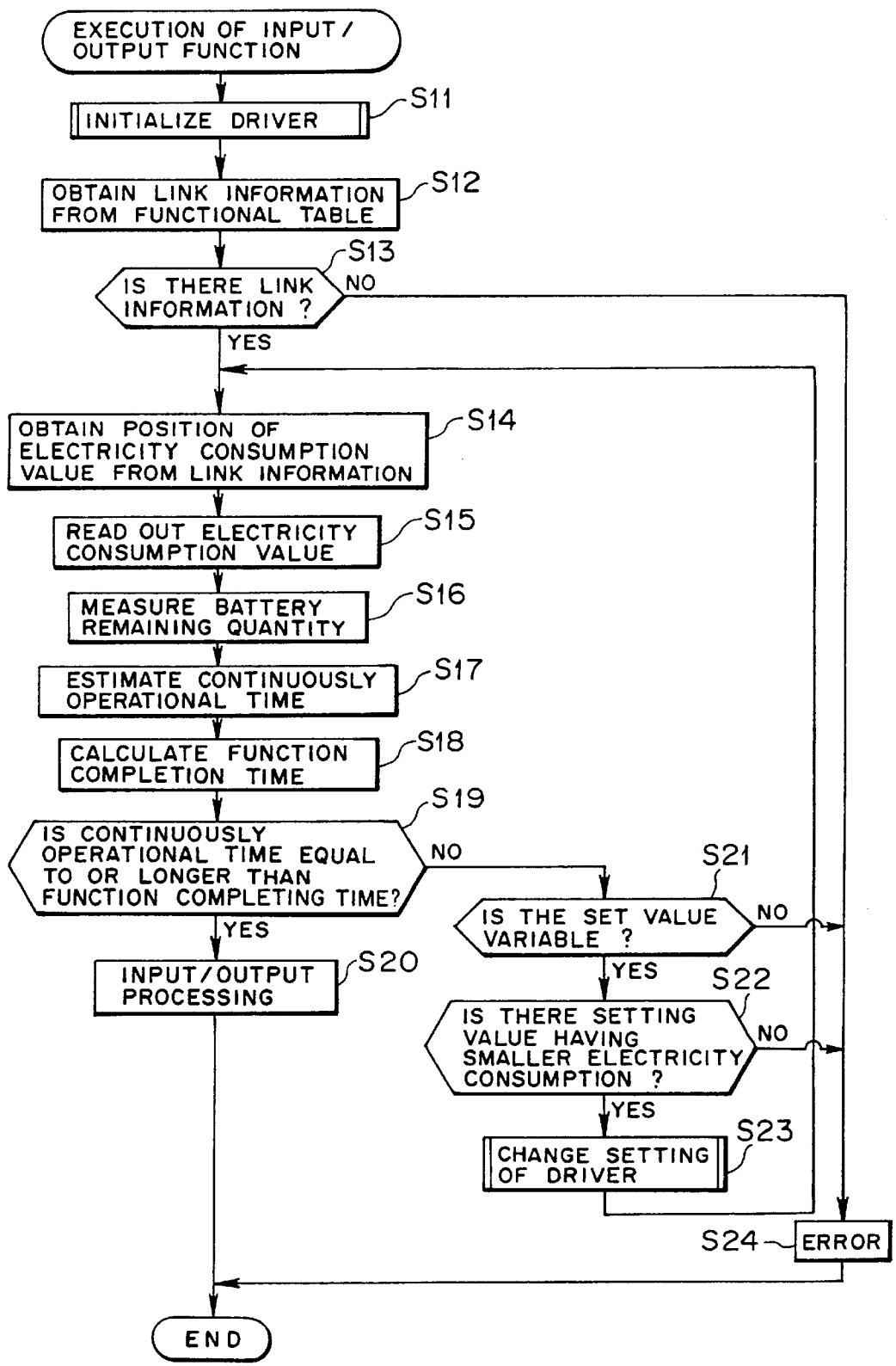
FIG. 5 is a flow chart showing a procedure for executing input/output function in the portable information terminal device according to the embodiment of the present invention.

When the processing of the flow chart shown in FIG. 5 is started, the CPU 11 first moves to a subroutine "initialize drivers" which will be described later, and initializes the drivers 21a to 21c corresponding to the function(step S11). By this "initialize drivers", the electricity consumption corresponding to the setting value of the driver is registered in the electricity consumption value table 33.

When the processing of the subroutine of "initialize drivers" is completed, the CPU 11 returns to a main routine, and looks for link information 32 for the function registered in the functional table 31 that is requested by the application programs 21a to 21c (step S12). Then the CPU 11 determines whether or not the link information 32 exists with respect to the function (step S13).

If it is determined that the link information 32 does not exist for the function in step S13, the processing is advanced to an error processing in step S24 which will be described later.

If it is determined that the link information 32 does exist for the function in step S13, the CPU 11 obtains address of the electricity consumption value in the electricity consumption value table 33 from the set link information 32 (step S14), and reads the electricity consumption value based on the obtained address (step S15).

Next, the CPU 11 obtains a remaining quantity of the battery 14 measured by the battery remaining quantity measuring instrument 17(step S16), and estimates a continuously operational time during which the corresponding input/output hardware 15a to 15c can continuously and stably be operated with the obtained remaining quantity of the battery 14 (step S17). Further, the CPU 11 calculates a function completing time that is necessary for completing the input/output function from the setting value of the driver transferred as the parameter and an amount of data to be input or output (step S18). The CPU 11 compares the continuously operational time estimated in step S17 and the function completing time calculated in step S18, and judges whether or not the continuously operational time is equal to or longer than the function completing time (step S19).

If it is judged that the continuously operational time is equal to or longer than the function completing time in step S19, the processing is advanced to step S20 which will be described later.

If it is judged that the continuously operational time is shorter than the function completing time in step S19, the CUP 11 determines whether it is possible to change the settings of the drivers for operating the input/output hardware 15a to 15c by the functions (step S21).

If it is not possible to change the settings of the drivers in step S21, the processing is advanced to an error processing in step S24 which will be described later.

If it is possible to change the settings of the drivers in step S21, the CPU 11 judges whether or not there is any other setting value capable of corresponding input/output hardware 15a to 15c (step S22).

If there is no setting value capable of further reducing the electricity consumption in step S22, the processing is advanced to error processing in step S24 which will be described later.

If there is another setting value capable of further reducing the electricity consumption in step S22, the CPU 11 moves to a subroutine of "change of setting of driver" which will be described latter, and the setting of the drivers 21a to 21c corresponding to this function is changed (step S23). The electricity consumption value whose electricity consumption is lower by one level is registered in the electricity consumption value table 33.

When the processing of the subroutine of "change of setting of driver" is completed, the CPU 11 returns to the main routine, and returns back to step S14, the same processing is continued based on the electricity consumption value newly registered in the electricity consumption value table 33.

Step S20 corresponds to a case in which there is enough remaining quantity of battery 14 for executing the function stably. Therefore, the CPU 11 executes the program of the driver body 42, and operates the corresponding input/output hardware 15a to 15c. With this operation, the corresponding input/output hardware 15a to 15c input or output data requested by the application programs 22a to 22c. Then, the processing of this flow chart is completed.

Step S24 corresponds to a case in which there is not enough remaining quantity of battery 14 for executing the function stably. Therefore, the CPU 11 returns information rejecting the input/output of data requested by the application programs 21a to 21c as parameters to the application programs, and conducts error processing for informing the user of error by displaying to that effect or alarming. The, the processing in the flow chart is completed.

Figure 6:
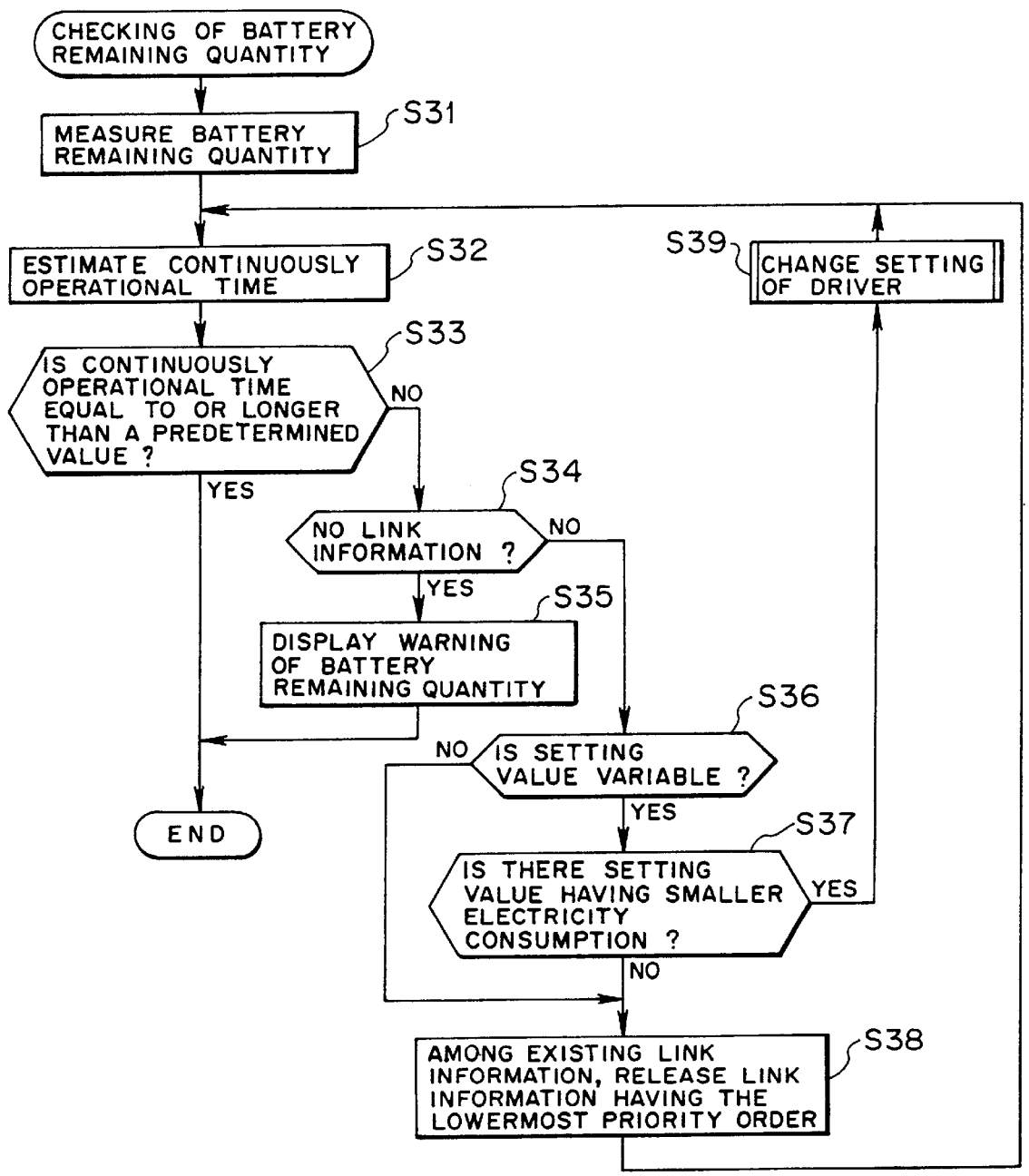
FIG. 6 is a flow chart showing procedure for checking a battery remaining quantity in the portable information terminal device according to the embodiment of the present invention.

Further, in the portable terminal device, an interrupt is generated at predetermnined time intervals from the timer 11a, and in accordance with the interrupt, "check of battery remaining quantity" which is a function of the operating system 20 and which is shown in a flow chart in FIG. 6 is conducted. This is performed independent of calls from application programs 21a to 21c.

When the processing of the flow chart in FIG. 6 is started, the CPU 11 obtains a remaining quantity of the battery 14 measured by the battery remaining quantity measuring instrument 17 (step S31). Next, the CPU 11 sequentially obtains electricity consumption values in the electricity consumption value table 33 linked by the link information 32 from the functional table 31, and estimates the continuous operational time during which the corresponding input/output hardware 15a to 15c can continuously and stably operate with the remaining quantity of the battery 14 obtained in step S11 (step S32). The CPU 11 judges whether or not all the continuously operational times estimated in step S32 are equal to or longer than a predetermined value (step S33). The predetermined value for the respective input/output hardware 15a to 15c may be different or the same for each.

When all the continuous operation times are not equal to or longer than a predetermined value in step S33, i.e., when any one of the estimated continuous operation times is not equal to or longer than the predetermined value, the CPU 11 judges whether or not the link information 32 between the functional table 31 and the electricity consumption value table 33 is available (step S34).

When it is judged that the link information 32 is available in step S34, the CPU 11 judges whether it is possible to change the setting value of a driver for operating any of the input/output hardware 15a to 15c (step S36).

When it is judged that it is not possible to change the setting value of the driver in step S35, the processing is advanced to step S38 which will be described later.

When it is judged that it is possible to change the setting value of the driver in step S35, the CPU 11 judges whether or not there is any other setting value capable of further reducing the electricity consumption of the corresponding input/output hardware 15a to 15c (step S36).

If it is judged that there is no setting value capable of further reducing the electricity consumption in step S36, the processing is advanced to processing in step S38.

If it is judged that there is other setting value capable of further reducing the electricity consumption in step S36, the CPU 11 moves to a subroutine of "change of setting of driver" which will be described later, and the setting of the drivers 21a to 21c corresponding to this function is changed (step S37). The electricity consumption value whose electricity consumption is lower by one level is registered in the electricity consumption value table 33.

When the processing of the subroutine of "change of setting of driver" is completed, the CPU 11 returns to the main routine, and returns back to step S32, the same processing is continued based on the electricity consumption value newly registered in the electricity consumption value table 33.

In step S38, the CPU 11 releases the link information 32 having the lowermost priority among the set link information 32. The CPU 11 returns to the processing of step S32, and the same processing is continued in accordance with the setting of the new link information.

When it is judged that the link information is not set in step S34, the shortage of remaining quantity of the battery 14 is displayed and alarm is given for warning the user of the shortage of remaining quantity of the battery 14 (step S35). Then the processing of the flow chart is completed.

On the other hand, when all the continuously operational times are equal to or longer than the predetermined value in step S33, the flow chart is completed as it is.

Figure 7:
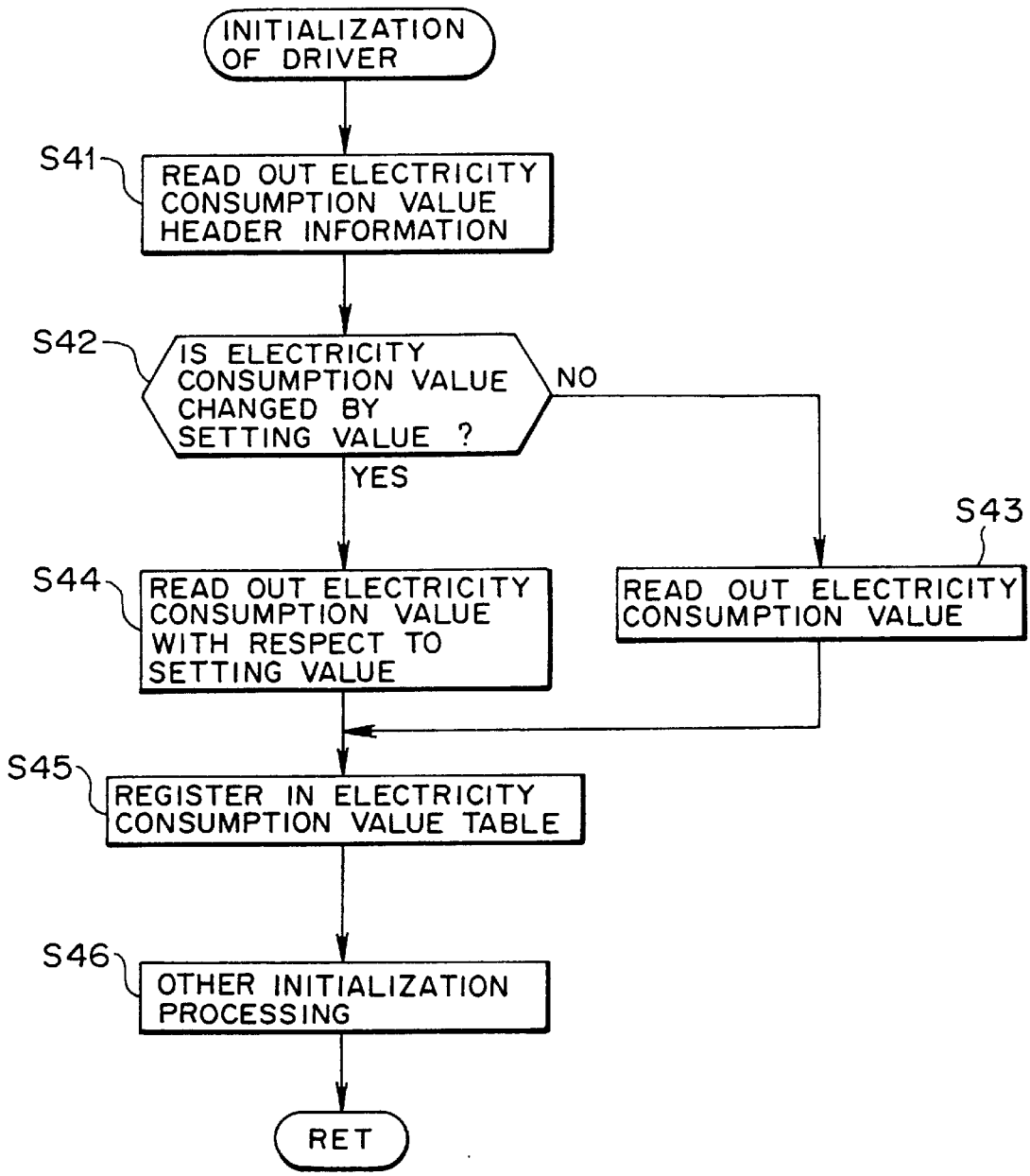
FIG. 7 is a flow chart showing procedure of a subroutine for initializing the driver.

Processing of subroutine of "Initialize of driver" in step S11 of FIG. 5 will be explained with reference to the flow chart in FIG. 7.

When the processing is started, the CPU 11 reads the electricity consumption value header information 43 of the corresponding drivers 21a to 21c (step S41). The CPU 11 judged whether or not the electricity consumption value is varied by the setting value from the read electricity consumption value header information 41(step S42).

When it is judged that the electricity consumption value is not varied by the setting value in step S42, the CPU 11 reads the electricity consumption value data 44 (step S43). Then, the processing is advanced to step S45.

When it is judged that the electricity consumption value is varied by the setting value in step S42, the CPU 11 refers the electricity consumption value header information 43 and reads the electricity consumption value data corresponding to the setting value among the electricity consumption value data 44a to 44n (step S44). Then, the processing is advanced to step S45.

In step S45, the CPU 11 registers the electricity consumption value data which is read in step S43 or S45 in corresponding address of the electricity consumption value table 33. The CPU 11 further carries out other initializing process such as initialization of the driver body 42 (step S46), and returns to the main routine.

Figure 8:
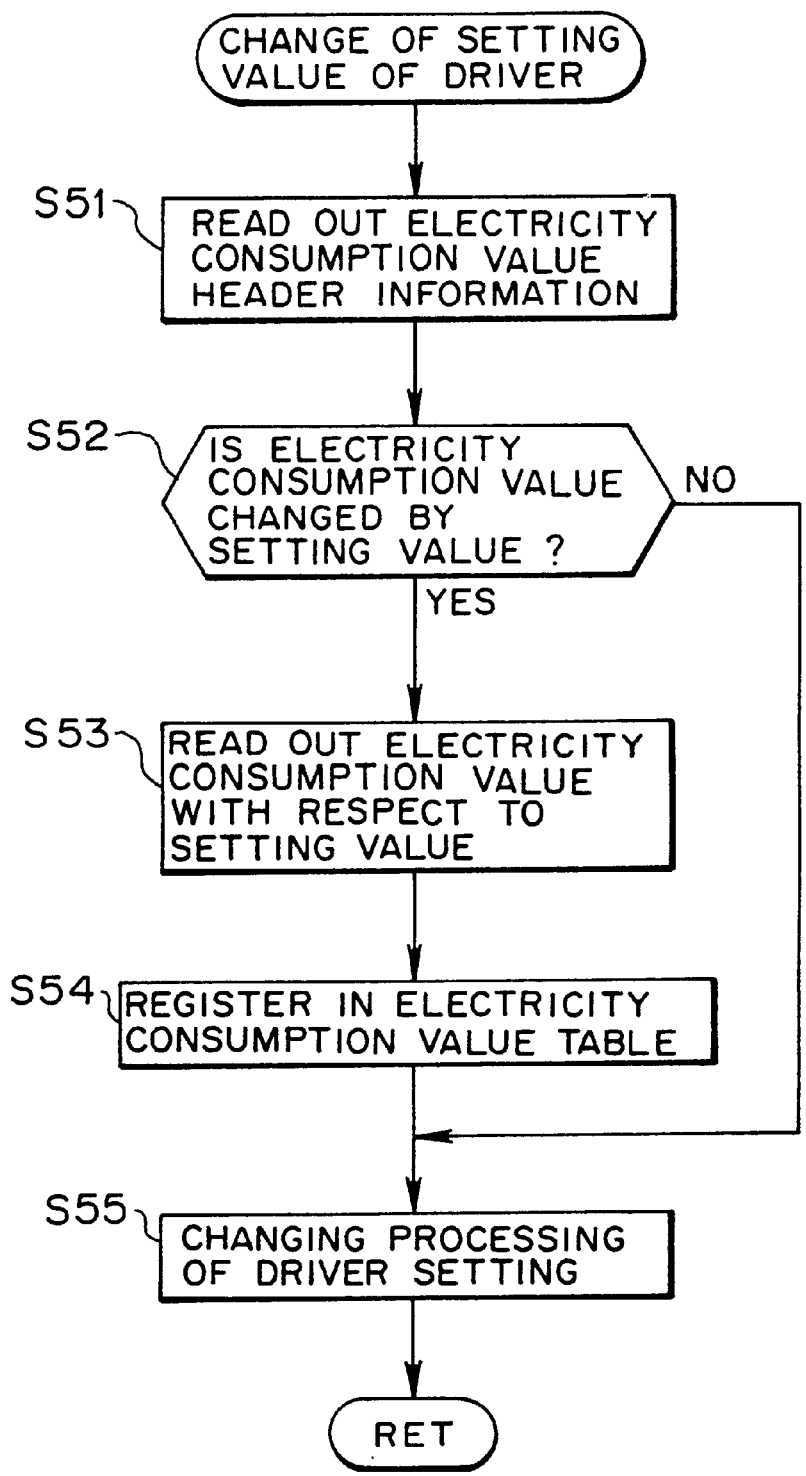
FIG. 8 is a flow chart showing procedure in subroutine for changing the setting of the driver.

Processing of subroutine of "Change in the setting of driver" in steps S23 and S39 of FIGS. 5 and 6 respectively will be explained with reference to a flow chart in FIG. 8.

When the processing is started, the CPU 11 reads the electricity consumption value header information 43 of the corresponding drivers 21a to 21c (step S51). The CPU 11 judged whether or not the electricity consumption value is varied by the setting value from the read electricity consumption value header information 41 (step S52).

When it is judged that the electricity consumption value is not varied by the setting value in step S52, the processing is advanced to step S55.

When it is judged that the electricity consumption value is varied by the setting value in step S52, the CPU 11 refers the electricity consumption value header information 43 and reads the electricity consumption value data corresponding to the setting value among the electricity consumption value data 44a to 44n (step S54). Further, the CPU 11 registers the electricity consumption value data which is read in step S53 in the corresponding address of the electricity consumption value table 33 (step S54). Then, the processing is advanced to step S55.

In step S55, the CPU 11 conducts the processing for changing the setting of the driver body 42, and the processing of this flow chart is completed.

As described above, in the portable terminal device according to the present embodiment, in order to continuously and stably operating the input/output hardware 15a to 15c even if the setting or set value of the link information 32 is changed, input/output function requested by the application programs 21a to 21c is not executed when the remaining quantity of the battery 14 is not sufficient (step S42). Therefore, it is possible to avoid unstable operation of the input/output hardware 15a to 15c when the remaining quantity of the battery 14 is not sufficient.

In the portable terminal device according to the present embodiment, since link information 32 having lower priority order is sequentially released by the processing of "checking of battery remaining quantity" executed in accordance with interrupt from the timer 11a, it is possible to reduce the electricity consumption when the remaining quantity of the battery 14 is not enough.

Further, in the portable terminal device according to the present embodiment, value is registered in the electricity consumption value table 33 and the link information 32 is set using the function of the operating system 20, and the operating system 20 controls the input/output based on the registered content in the electricity consumption value table 33 and the set link information 32. Therefore, even if the input/output hardware is changed or added, it is possible to cope with this without changing the operating system 20 if a corresponding driver is added.

Further, in the portable terminal device according to the present embodiment, when the electricity consumption of the input/output hardware 15a to 15c is changed by setting value, even if there is not a sufficient remainder of the battery 14 for continuously and stably operating the input/output hardware 15a to 15c with the initial setting, it is possible to operate the input/output hardware 15a to 15c by changing the setting value. Therefore, it is possible to allow the input/output hardware to operate as much as possible.

Figure 9:
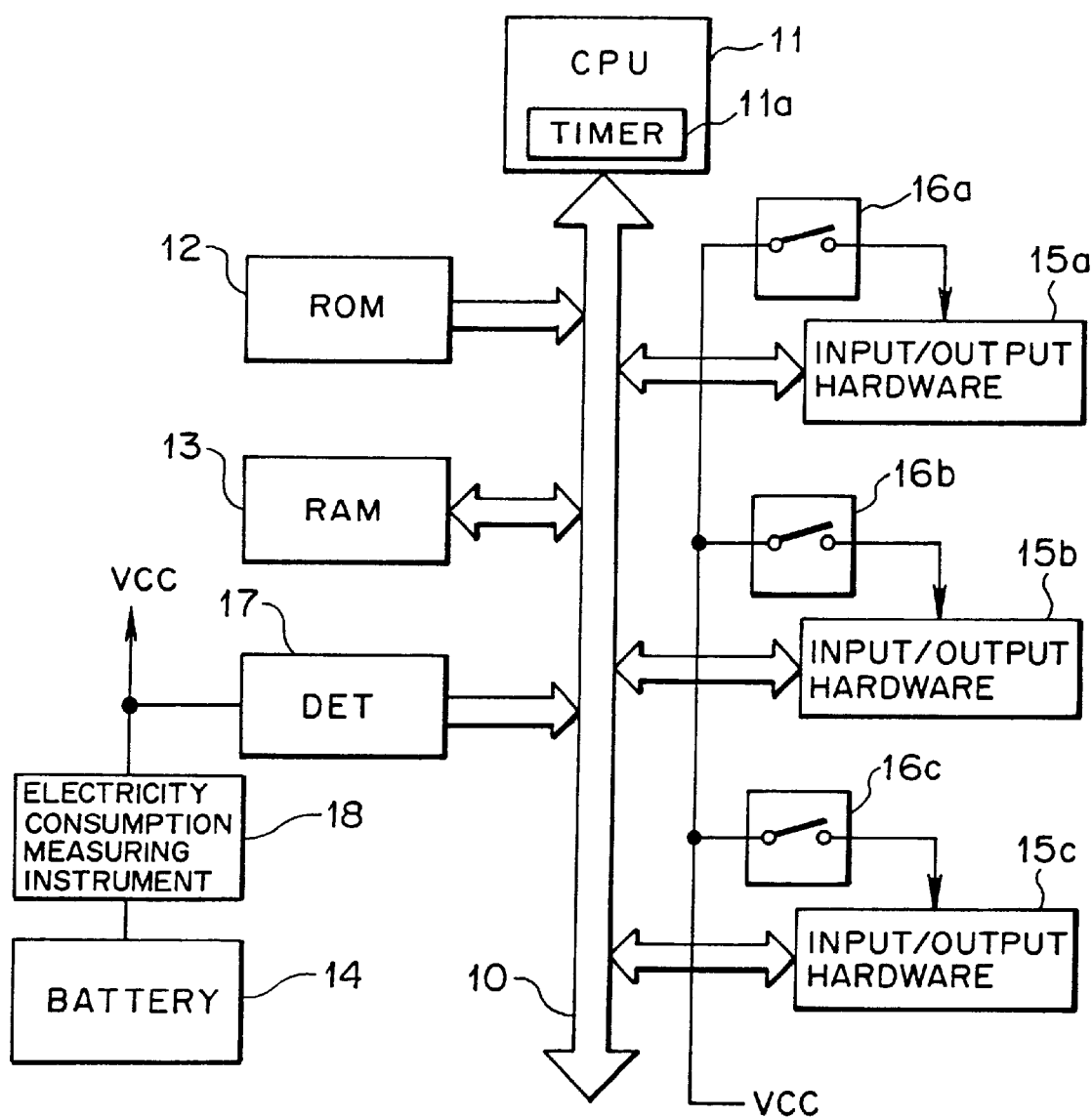
FIG. 9 is a block diagram showing a circuit structure of a portable information terminal device according to a modification of the embodiment of the invention.

In the above embodiment, the electricity consumption value of the input/output hardware 15a to 15c registered in the electricity consumption value table 33 is written in the corresponding drivers 21a to 21c as electricity consumption value data 44, 44a to 44n. As shown in FIG. 9, an electricity consumption measuring instrument 18 may be added to the structure in FIG. 2, and an electricity consumption value actually measured by this electricity consumption measuring instrument 18 may be registered in the electricity consumption value table 33. With this feature, even when the electricity consumption value table is not previously written in the drivers 21a to 21c, it is possible to cope with a variation in electricity consumption due to variation of characteristics of parts, or new compatible parts (such as PC card modem) which is announced after the registration to the drivers 21a to 21c.

In the above embodiment, the processing shown in the flow chart in FIG. 6 is executed in accordance with the interruption from the timer 11a in the CPU 11. This processing in the flow chart may be executed when the portable terminal device is turned ON.

The above embodiment has been described while taking the case where the entire portable terminal device is driven by electricity supplied from the battery 14. However, the present invention can be applied to a case where only the input/output hardware is driven by a battery. In this case, battery remaining quantity measuring means may be provided such as to correspond to the input/output hardware, and when a function of the requested input/output utilizes the input/output hardware which is driven by the battery, the same processing as described above may be carried out.

Although the above embodiment has been described while taking the case where the present invention is applied to the portable terminal device, the present invention can be applied to any types of information terminal devices which are driven by batteries (business power source supplied from electric power company may be used together) and which drive the input/output hardware.

In the above embodiment, the operating system 20 and programs of the drivers 21a to 21c which realize the function of the present invention are stored in the ROM 12. However, these programs may be stored in a floppy disk or CD-ROM and supplied, ad may be installed in a hard disk provided in the portable terminal device for example. Alternatively, these programs may be stored and supplied in ROM card which is designed to be detachably inserted to the portable terminal.

What is claimed is:

1. A battery-powered information terminal device comprising:
    an input/output device;
    a measuring circuit that provides an output representative of remaining capacity of a battery for the information terminal device;
    information storage circuitry that stores a device driver that operates the input/output device and includes information concerning electricity consumption for said input/output device during operation; and
    an information processing device operative to:
        register the stored electricity consumption information for the input/output device;
        judge the amount of electricity required to perform the operation according to a quantity of data involved in the operation and the registered electricity consumption information; and
        initiate the input/output operation if the remaining battery capacity as indicated by the output of the measuring circuit is at least as great as the judged amount of electricity required to perform the operation.

2. An information terminal device according to claim 1, further including
    a plurality of input/output devices, and a device driver stored in the information storage device for each input/output device; and wherein:
        the information processing device is operative to:
            register the stored electricity consumption information for each of the input/output devices;
            judge the amount of electricity required to perform an input/output operation by a selected input/output device according to a quantity of data involved in the operation and the registered electricity consumption information for the selected device; and
            initiate the input/output operation if the remaining battery capacity as indicated by the output of the measuring circuit is at least as great as the judged amount of electricity required to perform the input/output operation.

3. An information terminal device according to claim 2, wherein each device driver is capable of operating the respective input/output device in a normal mode, and in a second mode, the second mode being characterized by a lower electricity consumption than the normal mode, the electricity consumption for each mode being stored with the device driver,
    the information processing device being further operative, if there is insufficient remaining battery capacity for the selected input/output device to perform a requested operation in the normal mode, to:
        register the electricity consumption information for selected input/output device operating in the second mode;
        judge the amount of electricity required by the selected input/output device to perform the input/output operation according to the registered electricity consumption information for the second mode; and
        initiate the input/output operation in the second mode if the remaining battery capacity is sufficient for the input/output device to perform the operation in the second mode.

4. An information terminal device according to claim 1, wherein the device driver is capable of operating the input/output device in a normal mode, and in a second mode, the second mode being characterized by lower electricity consumption than the normal mode, the electricity consumption for each mode being stored with the device driver,
the information processing device being further operative, if there is insufficient remaining battery capacity for the input/output device to perform a requested operation in the normal mode, to:
register the electricity consumption information for the second mode;
judge the amount of electricity required to perform the input/output operation according to the registered electricity consumption information for the second mode; and
initiate the input/output operation in the second mode if the remaining battery capacity is sufficient to perform the operation with the input/output device operating in the second mode.

5. An information terminal device according to claim 1, wherein
the information processing device is operative to judge the amount of electricity required to perform an input/output operation by:
calculating a time required to perform the operation according to the quantity of data involved in the in the operation;
calculating an available continuous operational time for the input/output device based on the registered electricity consumption information and the remaining battery capacity indicated by the output of the first measuring circuit; and
comparing the time required to perform the input/output operation and the available continuous operational time.

6. A battery-powered information terminal device comprising:
an input/output device;
a first measuring circuit that provides an output representative of remaining capacity of a battery for the information terminal device;
an information storage circuit that stores a device driver for operating the input/output device;
a second measuring circuit that provides an output representative of electricity consumption by the input/output device; and
an information processing device operative to:
register the electricity consumption information output of the second measuring device;
judge the amount of electricity required to perform the operation according to a quantity of data involved in the operation and the registered electricity consumption information; and
initiate the input/output operation if the remaining battery capacity as indicated by the output of the first measuring circuit is at least as great as the judged amount of electricity required to perform the operation.

7. An information terminal device according to claim 6, wherein
the information processing device is operative to judge the amount of electricity required to perform the input/output operation by:
calculating a time required to perform the operation according to the quantity of data involved in the operation;
calculating an available continuous operational time for the input/output device based on the registered electricity consumption information and the remaining battery capacity indicated by the output of the first measuring circuit; and
comparing the time required to perform the input/output operation and the available continuous operational time.

8. An information terminal device according to claim 6, further including
a plurality of input/output devices, and a device driver stored in the information storage device for each input/output device; and wherein:
the information processing device is operative to:
register the stored electricity consumption information for each of the input/output devices;
judge the amount of electricity required to perform an input/output operation by a selected input/output device according to a quantity of data involved in the input/output operation by the selected device and the registered electricity consumption information for the selected device; and
initiate the input/output operation if the remaining battery capacity as indicated by the output of the measuring circuit is at least as great as the judged amount of electricity required for the selected device to perform the input/output operation.

9. A machine-readable storage medium for a data terminal input/output control program, the program being operative to:
execute an input/output operation by an input/output device controlled by a device driver, the device driver including electricity consumption information for the input/output device;
recognize a request for operation of the input/output device;
register the stored electricity consumption information from the device driver in an information processing device;
measure the remaining capacity of the battery when operation of the input/output device is requested; and
operate the information processing device to:
judge the amount of electricity required from the battery to perform the input/output operation according to a quantity of data involved in the requested operation and the registered electricity consumption information for the input/output device; and
initiate the input/output operation if the measured remaining battery capacity is at least as great as the judged amount of electricity required to perform the operation.

10. A machine-readable storage medium containing an input/output control program according to claim 9, the program being further operative to:
execute an input/output operation by a selected one of a plurality of input/output devices, each device respectively controlled by a device driver, the device driver including electricity consumption information for the respective input/output device;
register the stored electricity consumption information for each of the input/output devices in the information processing device;
judge the amount of electricity required to perform an input/output operation by a selected input/output device according to a quantity of data involved in the operation and the registered electricity consumption information for the selected device; and initiate the input/output operation if the remaining battery capacity as indicated by the output of the measuring circuit is at least as great as the judged amount of electricity required to perform the input/output operation.

11. A machine-readable storage medium containing an input/output control program according to claim 9, wherein:
the device driver is capable of operating the input/output device in a normal mode and in a second mode, the electricity consumption of the input/output device being the second mode than in the normal mode;
the device driver includes electricity consumption information for the input/output device for each mode; and
the program is further operative, if there is insufficient remaining battery capacity to perform the requested input/output operation in the normal mode, to:
register electricity consumption for the second mode;
judge the amount of electricity required to perform the input/output operation in the second mode according to the registered electricity consumption information for the second mode; and
initiate the input/output operation in the second mode if the remaining battery capacity is sufficient to perform the operation with the input/output device operating in the second mode.

12. A method for controlling input/output operations in a battery-powered formation terminal device comprising:
storing electricity consumption information together with operating information for an input/output device;
recognizing a request for operation of the input/output device;
registering the stored electricity consumption information for the input/output device in an information processing device;
measuring the remaining capacity of the battery; and
operating the information processing device to:
judge the amount of electricity required from the battery to perform the input/output operation according to a quantity of data involved in the operation and the registered electricity consumption information for the input/output device; and
initiate the input/output operation if the measured remaining battery capacity is at least as great as the judged amount of electricity required to perform the input/output operation.

13. An input/output control method according to claim 12, wherein the device driver is capable of operating the associated input/output device in a normal mode and in a second mode, the electricity consumption of the input/output device being lower in the second mode than in the normal mode, electricity consumption information for each mode being associated with the device driver; and
the method further comprises, if there is insufficient remaining battery capacity to perform the requested input/output operation in the initial mode:
registering electricity consumption for the second mode;
judging the amount of electricity required to perform the input/output operation in the second mode according to the registered electricity consumption information for the second mode; and
initiating the input/output operation in the second mode if the remaining battery capacity is sufficient for the input/output device to perform the, operation in the second mode.

14. A battery-powered information terminal device comprising:
a plurality of input/output devices;
a first device that provides an output representative of a remaining battery capacity of a battery for the information terminal device;
an information storage circuit that stores a plurality of device drivers for operating each of the input/output devices, wherein each device driver is capable of operating the respective input/output devices in a normal mode, and in a second mode, the second mode being characterized by a lower electricity consumption than the normal mode, the electricity consumption for each mode being stored in the device driver;
a second device that provides an output representative of the electricity consumption by the input/output devices; and
an information processing device operative to:
register the electricity consumption information output of the second device;
calculate a time required to perform a selected input/output operation of a selected input/output device according to a quantity of data involved in the operation;
calculate an available continuous operational time for the selected input/output device based on the registered electricity consumption information and the remaining battery capacity indicated by the output of the first measuring circuit;
compare the time required to perform the selected input/output operation and the available continuous operational time; and
selectively release a link information for a function in a predetermined order of priority if there is insufficient remaining battery capacity for the selected input/output device to perform the selected input/output operation in the normal mode or the second mode based upon said comparison.

15. The information terminal device of claim 14, wherein said information processing device is further operative to repeat said operation to register, calculate and compare for said selected input/output device after said operation to selectively release said link information.

16. A battery-powered information terminal device comprising:
a plurality of input/output devices operated by a plurality of device drivers;
a first device provides an output representative of a remaining capacity of a battery for the information terminal device;
a second device that provides an output representative of an electricity consumption by the input/output devices; and
an information processing device operative to:
register the electricity consumption information of a selected input/output device output by the second device;
calculate a time required to perform a selected input/output operation of the selected input/output device according to a quantity of data involved in the operation;
calculate an available continuous operational time for the selected input/output device based on the registered electricity consumption information and the remaining battery capacity indicated by the output of the first measuring circuit;

compare the time required to perform the selected input/output operation and the available continuous operational time; and selectively release a link information for a function in a predetermined order of priority if there is insufficient remaining battery capacity for the selected input/output device to perform the selected input/output operation based upon said comparison.

17. The information terminal device of claim 16, wherein said information processing device is further operative to repeat said operation to register, calculate and compare for said selected input/output device after said operation to selectively release said link information.

18. A machine-readable storage medium storing a data terminal input/output control program, the program being operative to:

recognize a request for operation of an input/output device;

register a stored electricity consumption information from a device driver in an information processing device;

measure a remaining capacity of a battery when the operation of the input/output device is requested; and operate the information processing device to:

calculate a time required to perform the operation of the input/output device according to a quantity of data involved in the operation;

calculate an available continuous operational time for the input/output device based on the registered electricity consumption information and the remaining capacity of the battery;

compare the time required to perform the input/output operation and the available continuous operational time; and selectively release a link information of a function in a predetermined order of priority if there is insufficient remaining battery capacity based upon said comparison.

19. The program of claim 18 wherein said information processing device is further operative to repeat said operation to register, calculate and compare for said input/output device after said operation to selectively release a link information of a function.

20. A method for controlling input/output operations in a battery-powered information terminal device comprising:

recognizing a request for operation of the input/output device;

registering a stored electricity consumption information for the input/output device in an information processing device;

measuring the remaining capacity of a battery; and operating the information processing device to:

calculate a time required to perform the operation of the input/output device according to a quantity of data involved in the operation;

calculate an available continuous operational time for the input/output device based on the registered electricity consumption information and the remaining battery capacity;

compare the time required to perform the input/output operation and the available continuous operational time; and selectively release a link information of a function in a predetermined order of priority if there is insufficient remaining battery capacity based upon said comparison for the input/output device to perform a requested operation.

21. The method of claim 20 wherein said information processing device is further operative to repeat said operation to register, calculate and compare for said input/output device after said operation to selectively release said link information.

22. An input/output control method for controlling a battery-powered input/output device in an information terminal device, the method comprising:

measuring electricity consumption of the input/output device when in operation;

registering measured electricity consumption information for the input/output device in an information processing device;

recognizing a request for operation of the input/output device;

measuring the remaining capacity of the battery;

operating the information processing device to:

judge the amount of electricity required from the battery to perform the input/output operation according to a quantity of data involved in the requested operation and the registered electricity consumption information; and initiate the input/output operation if the measured remaining battery capacity is at least as great as the judged amount of electricity required to perform the input/output operation.

23. A machine-readable storage medium containing an input/output control program for a data terminal device, the program being operative to:

execute an input/output operation by an input/output device controlled by a device driver;

measure electricity consumption when the device driver operates the input/output device;

register the measured electricity consumption in a data processing device;

measure the remaining capacity of the battery when operation of the input/output device is requested; and operate the information processing device to:

judge the amount of electricity required from the battery to perform the input/output operation according to a quantity of data involved in the input/output operation and the registered electricity consumption information for the input/output device; and initiate the input/output operation if the measured remaining battery capacity is at least as great as the judged amount of electricity required to perform the input/output operation.

* * * * *